US011640100B2

(12) United States Patent
Lee et al.

(10) Patent No.: US 11,640,100 B2
(45) Date of Patent: May 2, 2023

(54) CAMERA MODULE

(71) Applicant: Samsung Electro-Mechanics Co., Ltd., Suwon-si (KR)

(72) Inventors: Jong Gi Lee, Suwon-si (KR); Jin Se Kim, Suwon-si (KR); Ju Sung Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 246 days.

(21) Appl. No.: 16/935,742

(22) Filed: Jul. 22, 2020

(65) Prior Publication Data

US 2021/0063843 A1    Mar. 4, 2021

(30) Foreign Application Priority Data

Sep. 2, 2019  (KR) .......................... 10-2019-0108011

(51) Int. Cl.
*G03B 17/12*    (2021.01)
*H04N 23/55*    (2023.01)
*G03B 7/12*    (2021.01)

(52) U.S. Cl.
CPC ............... *G03B 7/12* (2013.01); *G03B 17/12* (2013.01); *H04N 23/55* (2023.01)

(58) Field of Classification Search
CPC ...... H04N 5/2254; G03B 17/12; G03B 30/00; G03B 17/02; G02B 7/025; G02B 7/022
See application file for complete search history.

(56) References Cited

U.S. PATENT DOCUMENTS

| 6,501,605 | B2 | 12/2002 | Moriya |
| 2002/0126398 | A1 | 9/2002 | Moriya |
| 2009/0251800 | A1 | 10/2009 | Iwai |
| 2015/0273799 | A1 | 10/2015 | Takama et al. |
| 2018/0309913 | A1 | 10/2018 | An et al. |
| 2020/0049953 | A1* | 2/2020 | Wei .................... G02B 7/022 |

(Continued)

FOREIGN PATENT DOCUMENTS

| CN | 1299981 A | 6/2001 |
| CN | 101443687 A | 5/2009 |
| CN | 104950411 A | 9/2015 |

(Continued)

OTHER PUBLICATIONS

Korean Office Action dated Dec. 7, 2020 in counterpart Korean Patent Application No. 10-2019-0108011. (8 pages in English)(6 pages in Korean).

(Continued)

*Primary Examiner* — Christopher E Mahoney
(74) *Attorney, Agent, or Firm* — NSIP Law

(57) ABSTRACT

A camera module includes a barrel defining a hole to receive light reflected from a subject, and defining a lens accommodation space to accommodate a plurality of lenses, a front lens accommodated in the lens accommodation space and disposed closest to the subject, a rear lens accommodated in the lens accommodation space and disposed closest to an imaging plane, and an intermediate lens disposed between the front lens and the rear lens. An inlet is defined in a side surface of the barrel, the inlet is connected to the lens accommodation space, and an adhesive bonding the intermediate lens to the barrel is disposed in the inlet.

12 Claims, 10 Drawing Sheets

(56) References Cited

U.S. PATENT DOCUMENTS

2022/0128888 A1  4/2022  Lee et al.

FOREIGN PATENT DOCUMENTS

| | | | | |
|---|---|---|---|---|
| CN | 105717602 A | | 6/2016 | |
| CN | 108292082 A | | 7/2018 | |
| CN | 109116507 A | | 1/2019 | |
| CN | 209330238 U | | 8/2019 | |
| CN | 214586182 U | | 11/2021 | |
| JP | 2005-338869 A | | 12/2005 | |
| JP | 2007-183505 A | | 7/2007 | |
| JP | 2009244393 A | * | 10/2009 | ............... G02B 7/02 |
| JP | 2010-134286 A | | 6/2010 | |
| JP | 2017-107230 A | | 6/2017 | |
| JP | 2020098310 A | * | 6/2020 | ............. G02B 7/021 |
| KR | 10-2001-0062237 A | | 7/2001 | |
| KR | 2001-0062237 A | | 7/2001 | |
| KR | 10-0831867 B1 | | 5/2008 | |
| KR | 10-2015-0034523 A | | 4/2015 | |
| KR | 10-2017-0029722 A | | 3/2017 | |

OTHER PUBLICATIONS

Chinese Office Action dated May 5, 2022, in counterpart Chinese Patent Application No. 202010841588.9 (7 pages in English and 9 pages in Chinese).

Chinese Office Action dated Jan. 10, 2023, in counterpart Chinese Patent Application No. 202010841588.9 (7 pages in English, 7 pages in Chinese).

* cited by examiner

A-A'

C-C'

CAMERA MODULE

CROSS-REFERENCE TO RELATED APPLICATION(S)

This application claims the benefit under 35 USC 119(a) of Korean Patent Application No. 10-2019-0108011 filed on Sep. 2, 2019 in the Korean Intellectual Property Office, the entire disclosure of which is incorporated herein by reference for all purposes.

BACKGROUND

1. Field

The following description relates to a camera module configured to improve coupling reliability between a lens and a barrel.

2. Description of Related Art

Camera modules commonly include a barrel accommodating a plurality of lenses. The plurality of lenses is sequentially mounted inside the barrel. A gap maintaining member is disposed between the lens and the lens as necessary. For example, after assembling one or more lenses inside the barrel, a gap maintaining member may be additionally mounted inside the barrel. Thereafter, one or more lenses may be further mounted inside the barrel.

The coupling between the lens and the barrel is made by a press-fit member or a lens (hereinafter, referred to as the final lens) finally mounted inside the barrel. For example, the final lens combined with the barrel in a forced fit or by an adhesive serves to fix the plurality of lenses, to be prevented from being separated from the inside of the barrel.

However, since the camera module of the above-described structure has a structure in which only the final lens or the press-fit member is coupled to the barrel, coupling reliability between the barrel and other lenses is relatively low. In addition, since water vapor or the like remaining inside the barrel is not discharged externally, there is a problem in that the production yield of the camera module due to water vapor or foreign matter is deteriorated.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

A camera module configured to improve manufacturing yield while improving coupling reliability between a barrel and a lens.

In one general aspect, a camera module includes a barrel defining a hole to receive light reflected from a subject, and defining a lens accommodation space to accommodate a plurality of lenses, a front lens accommodated in the lens accommodation space and disposed closest to the subject, a rear lens accommodated in the lens accommodation space and disposed closest to an imaging plane, and an intermediate lens disposed between the front lens and the rear lens. An inlet is defined in a side surface of the barrel, the inlet is connected to the lens accommodation space, and an adhesive bonding the intermediate lens to the barrel is disposed in the inlet.

The inlet may extend in a direction intersecting an optical axis of the barrel.

A guide groove connected to an end of the inlet may be disposed in an inner circumferential surface of the barrel.

The guide groove may have a circular or spiral shape along an inner circumferential surface of the barrel.

The intermediate lens may define a groove disposed in an outer circumferential surface thereof, and the groove may accommodate the adhesive.

The intermediate lens may have a first length in a first direction intersecting an optical axis and a second length, different from the first length, in a second direction intersecting the optical axis and the first direction.

One side of the intermediate lens intersecting the optical axis may be linear.

In another general aspect, a camera module includes a barrel defining a lens accommodation space configured to accommodate a plurality of lenses; a first lens disposed in the lens accommodation space and in contact with an inner circumferential surface of the barrel; and a second lens disposed in the lens accommodation space and spaced apart from the inner circumferential surface of the barrel by a separation space, wherein an inlet is defined in a side surface of the barrel and an adhesive is injected into the separation space through the inlet.

The first lens and the second lens may each include irregularities such that an optical axis is aligned by mutual coupling of the first and second lenses.

The barrel may define a guide groove disposed in the inner circumferential surface of the barrel and connected to an end of the inlet.

The guide groove may have a circular or spiral shape along the inner circumferential surface of the barrel.

The inlet may include a plurality of inlets disposed at intervals in a circumferential direction of the barrel.

The first lens may be disposed on an object side of the second lens with respect to an optical axis of the barrel.

The first lens may be disposed on an image side of the second lens with respect to an optical axis of the barrel.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
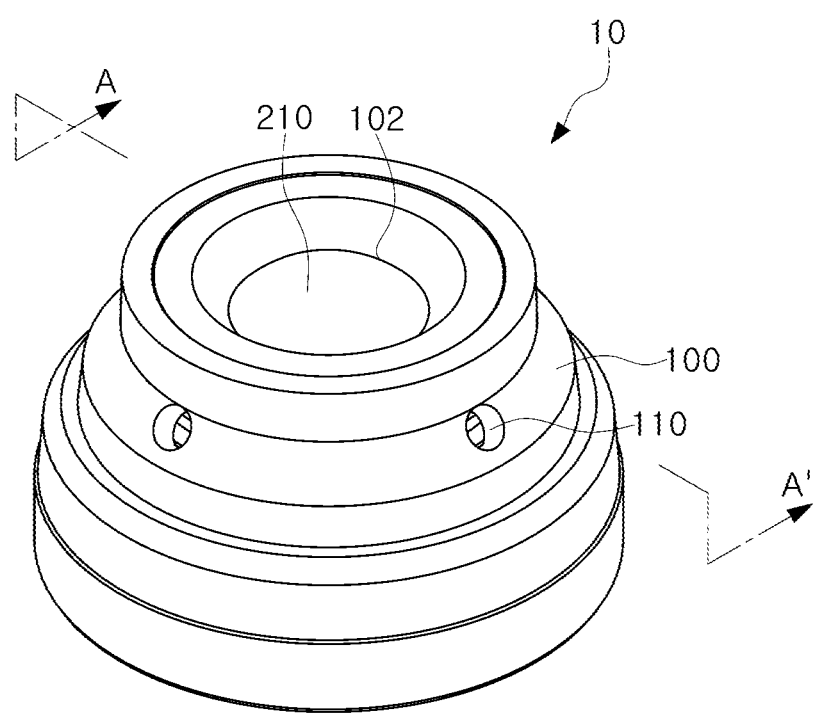
FIG. 1 is a perspective view of a camera module according to an example.
Figure 2:
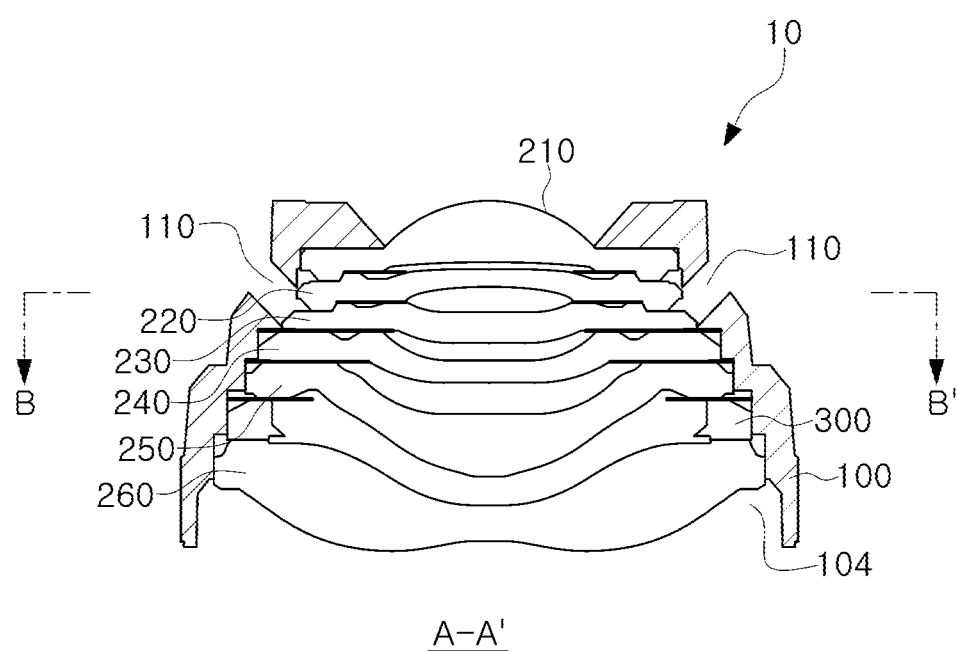
FIG. 2 is an A-A' cross-sectional view of the camera module illustrated in FIG. 1.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

A camera module according to an example will be described with reference to FIGS. 1 to 4B.

A camera module 10 according to an example includes a barrel 100 and lenses 210, 220, 230, 240, 250 and 260. The camera module 10 may further include a gap maintaining member 300 maintaining a gap between lenses.

The barrel 100 includes a lens accommodation space 104 for accommodating the lens. For example, the lens accommodation space 104, in which a plurality of lenses is sequentially accommodated, is formed inside the barrel 100. The lens accommodation space 104 is formed to gradually widen from one side of the barrel 100 to the other side thereof. For example, the lens accommodation space 104 may be formed to gradually widen from an upper portion of the barrel 100 to a lower portion of the barrel 100 (toward an image sensor side).

A hole is formed in the upper and lower portions of the barrel 100 to allow light to pass therethrough. For example, a hole 102 is formed in an upper portion of the barrel 100 to receive light reflected from an object (or a subject), and a hole is formed in a lower portion of the barrel 100, through which light refracted through a lens is projected onto an imaging plane (or an image sensor).

The barrel 100 is formed with an inlet 110 lengthily extending into the lens accommodation space 104. For example, one or more inlets 110 extending inwardly of the barrel 100 are formed in a side surface of the barrel 100. The inlets 110 are formed at intervals therebetween in a circumferential direction of the barrel 100. The inlets 110 extend in a direction substantially intersecting the optical axis of the barrel 100.

Figure 4A:
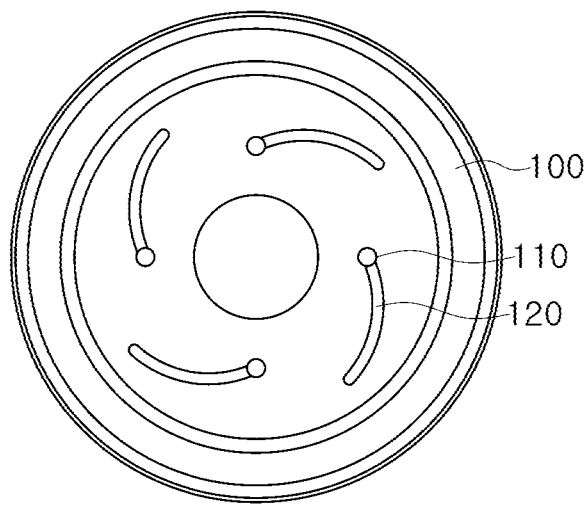
FIG. 4A is a bottom view of a barrel illustrated in FIG. 2.
Figure 4B:
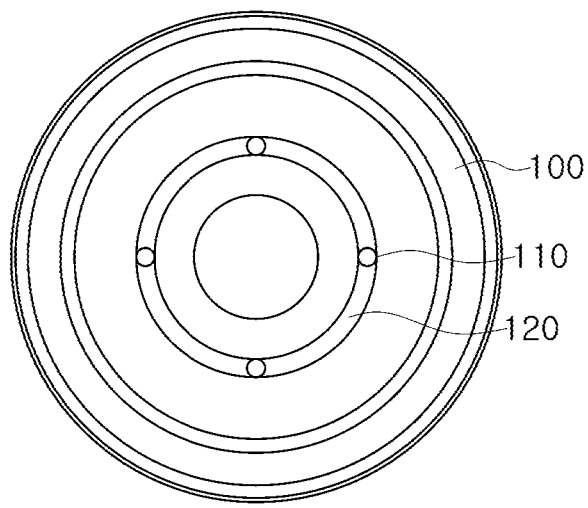
FIG. 4B is a bottom view illustrating another form of the barrel illustrated in FIG. 2.

In the inner circumferential surface of the barrel 100, a guide groove 120 connected to one end of the inlet 110 is formed (see FIGS. 4A and 4B). The guide groove 120 may extend in the circumferential or height direction of the barrel 100. For example, the guide groove 120 may be formed in a spiral form as illustrated in FIG. 4A. If necessary, the guide groove 120 may also be formed to have a circular shape or a linear form rather than a spiral form, as illustrated in FIG. 4B.

The lenses 210, 220, 230, 240, 250 and 260 are accommodated inside the barrel 100. For example, the first lens 210, the second lens 220, the third lens 230, the fourth lens 240, the fifth lens 250, and the sixth lens 260 are sequentially disposed in the height direction of the barrel 100. The first lens 210 to the sixth lens 260 may be divided into a front lens, an intermediate lens, and a rear lens depending on the position in which the lenses are disposed. The first lens 210 is a front lens disposed closest to the object side in the interior of the barrel 100, the second lens 220 to the fifth lens 250 are intermediate lenses, and the sixth lens 260 may be a rear lens disposed closest to the imaging plane in the interior of the barrel 100.

The positions of the first lens 210 and the sixth lens 260 may be aligned while being in contact with the barrel 100. For example, an upper portion and a side surface of the flange portion of the first lens 210 may be in contact with the inner circumferential surface of the barrel 100 such that the positions thereof relative to the barrel 100 may be aligned. Similarly, the side surface of the flange portion of the sixth lens 260 may contact the inner circumferential surface of the barrel 100, such that the position thereof relative to the barrel 100 may be aligned.

The second lens 220 to the fifth lens 250, the intermediate lenses, may be fixed to the barrel 100 by an adhesive 400. For example, the adhesive 400 introduced through the inlet 110 of the barrel 100 flows along the guide groove 120 and the inner circumferential surface of the barrel 100, and may thus bond one or more of the second lens 220 to the fifth lens 250 to the barrel 100.

Figure 3:
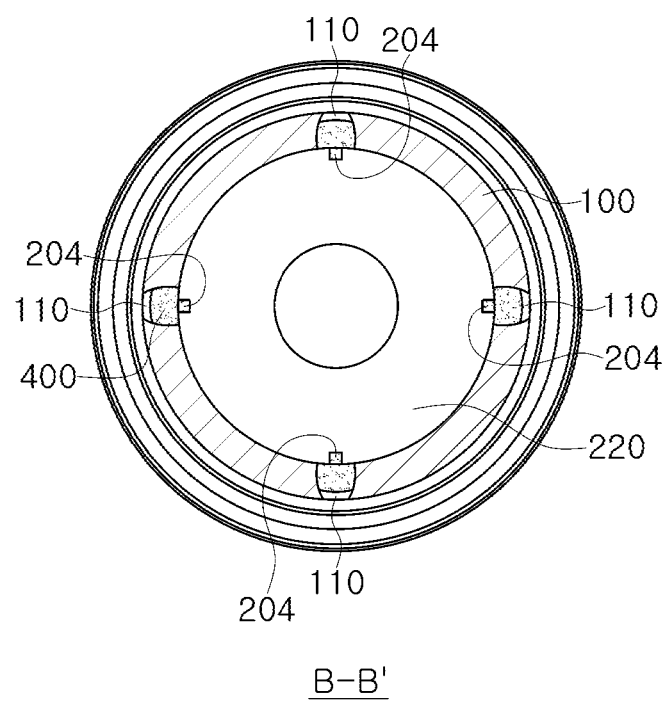
FIG. 3 is a cross-sectional view taken along line B-B of the camera module illustrated in FIG. 2.

A groove for accommodating the adhesive 400 may be formed in the second lens 220 to the fifth lens 250. For example, one or more grooves 204 capable of accommodating the adhesive 400 may be formed in the outer circumferential surface of the second lens 220 as illustrated in FIG. 3. The groove 204 formed in the intermediate lens may increase the contact area between the intermediate lens and the adhesive 400 to increase the bonding force between the intermediate lens and the barrel 100.

In the case of the camera module 10 configured as described above, since a plurality of intermediate lenses disposed between the front lens and the rear lens may be firmly fixed to the inside of the barrel, the occurrence of positional deviation of the intermediate lens due to the impact applied to the camera module 10 may be significantly reduced. In addition, in the camera module 10 configured as described above, an image quality degradation phenomenon of the camera module 10 due to the deviation of the position of the intermediate lens may be prevented.

Next, another form of the camera module will be described. For reference, in the following description, the same components as in the above-described example use the same reference numerals as in the above-described example, and detailed description of these elements is omitted.

Figure 5:
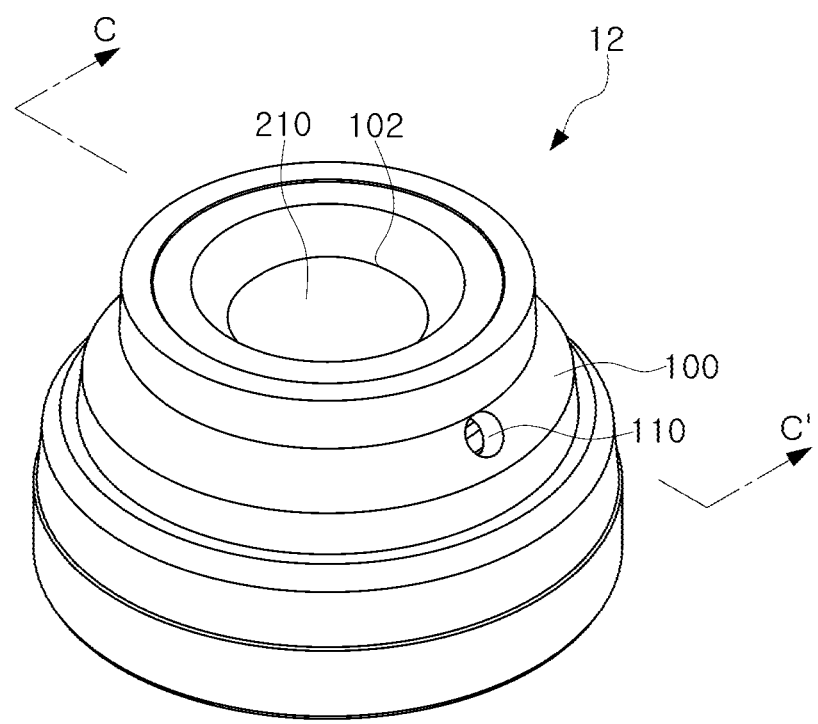
FIG. 5 is a perspective view of a camera module according to another example.

A camera module according to another example will be described with reference to FIGS. 5 and 6.

A camera module 12 according to another example includes a barrel 100 and lenses 210, 220, 230, 240, 250 and 260.

The barrel 100 is formed with inlets 110 extending into a lens accommodation space. The inlets 110 are disposed with an interval therebetween in a circumferential direction of the barrel 100. For reference, in this example, two inlets 110 are formed in the barrel 100. The inlets 110 are formed so that an adhesive 400 is supplied to one side of the intermediate lens. For example, the inlets 110 may be formed so that the adhesive 400 is supplied to the linear-shaped side of the intermediate lens.

The lenses may be referred to as a first lens 210, a second lens 220, a third lens 230, a fourth lens 240, a fifth lens 250 and a sixth lens according to the order in which they are disposed in the lens accommodation space of the barrel 100. In addition, the first lens 210 to the sixth lens 260 may be classified as a front lens, an intermediate lens, and a rear lens depending on the positions in which the lenses are disposed. The first lens 210 is a front lens disposed closest to the object side in the interior of the barrel 100, the second lens 220 to the fifth lens 250 are intermediate lenses, and the sixth lens 260 is a rear lens disposed closest to an imaging plane in the interior of the barrel 100.

Figure 6:
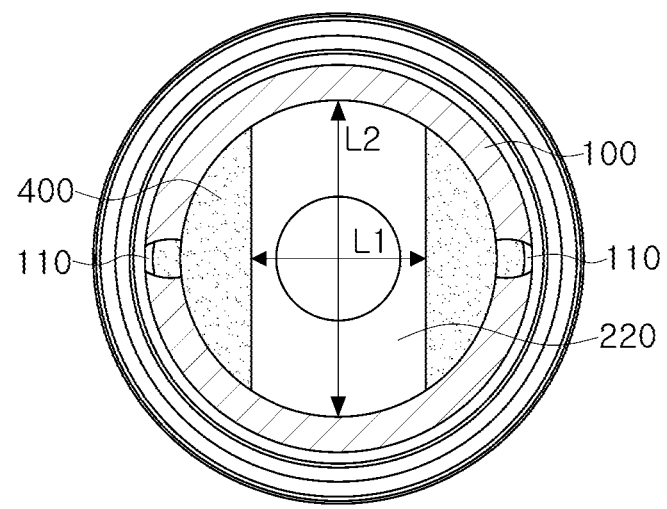
FIG. 6 is a cross-sectional view taken along line C-C of the camera module illustrated in FIG. 5.
Figure 7:
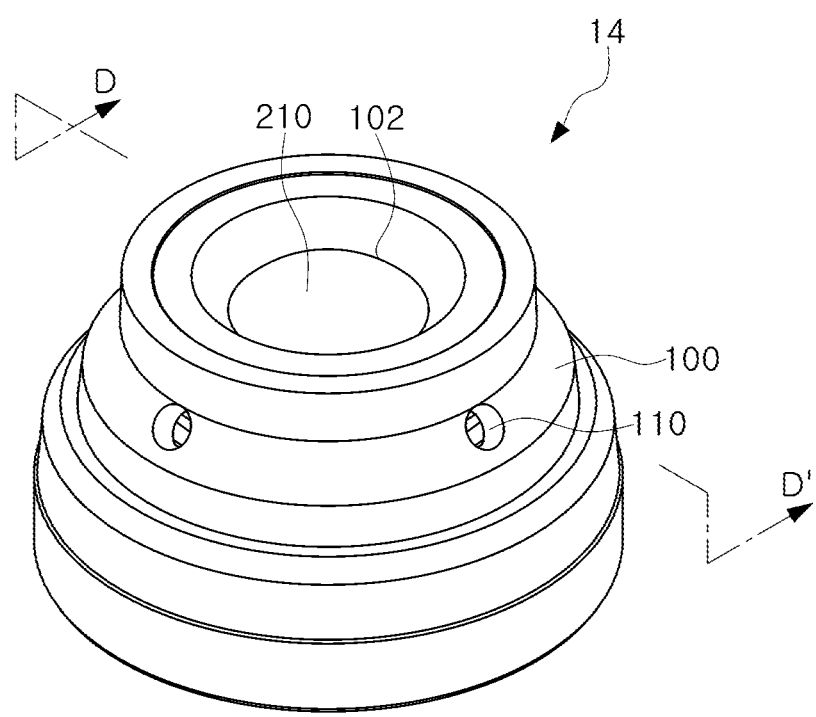
FIG. 7 is a perspective view of a camera module according to another example.
Figure 8:
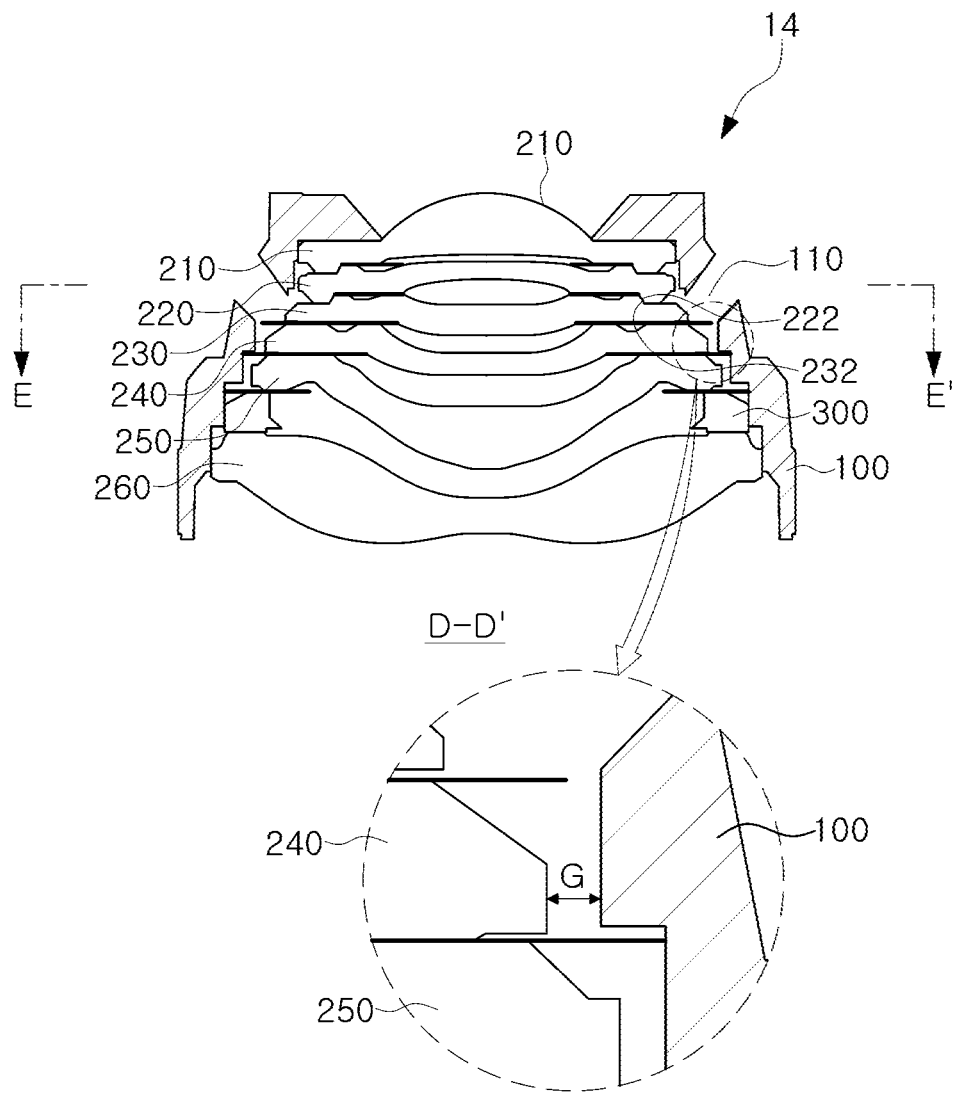
FIG. 8 is a D-D cross-sectional view of the camera module illustrated in FIG. 7.
Figure 9:
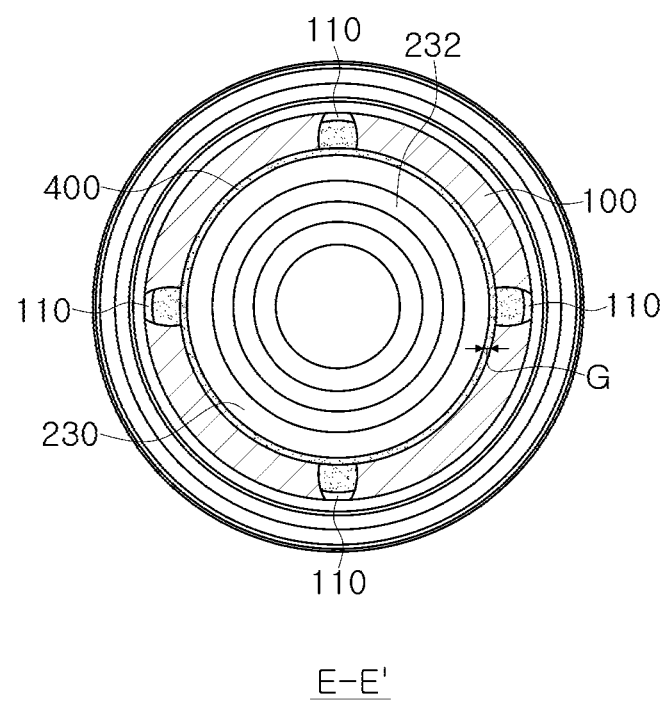
FIG. 9 is an E-E cross-sectional view of the camera module illustrated in FIG. 8.

As illustrated in FIG. 6, at least one of the second lens 220 to the fifth lens 250, the intermediate lenses, may have different shapes in the first direction and the second direction, intersecting the optical axis. For example, a length L1 of the second lens 220 in the first direction may be different from a length L2 thereof in the second direction. For reference, in this example, the length L1 in the first direction is less than the length L2 in the second direction. At least one of the second lens 220 to the fifth lens 250, an intermediate lens, may have a linear-shaped side surface as illustrated in FIG. 6. For example, both sides of the second lens 220, parallel to the second direction, may be linear. Alternatively, both sides of the second lens 220, parallel to the first direction, may be curved.

The adhesive 400 is supplied to the linear-shaped side surface of the second lens 220 as described above. The supplied adhesive 400 fills a space between the lens accommodation space of the barrel 100 and the second lens 220, and simultaneously, may firmly bond the barrel 100 and the second lens 220.

Next, a camera module according to another example will be described with reference to FIGS. 7 to 10B.

A camera module 14 according to another example includes a barrel 100, lenses 210, 220, 230, 240, 250 and 260, and a gap maintaining member 300.

Figure 10A:
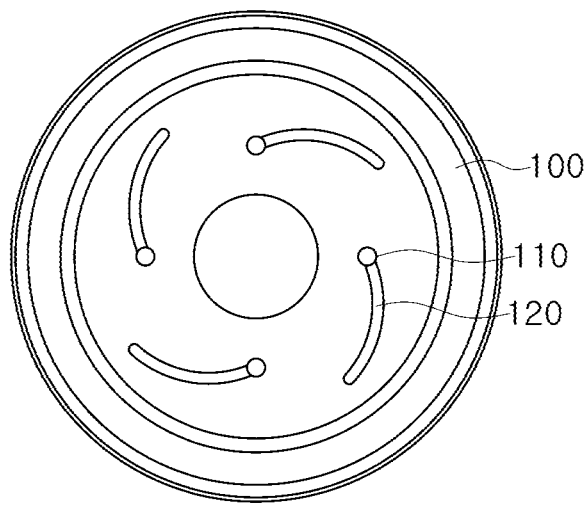
FIG. 10A is a bottom view of the barrel illustrated in FIG. 7.
Figure 10B:
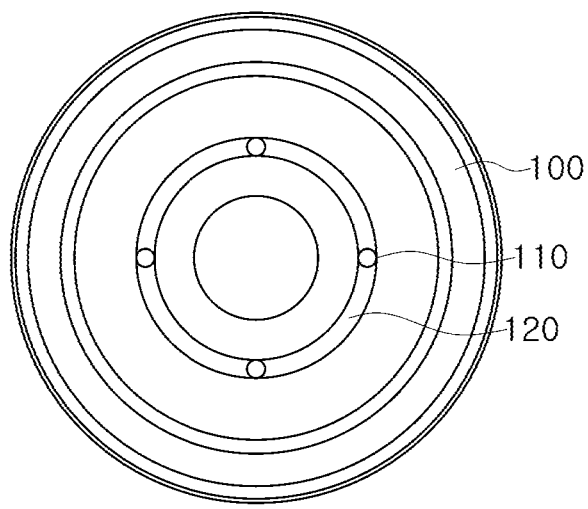
FIG. 10B is a bottom view illustrating another form of the barrel illustrated in FIG. 7.

The barrel 100 is formed with inlets 110 extending into a lens accommodation space. The inlets 110 are disposed with an interval therebetween in a circumferential direction of the barrel 100. In an inner circumferential surface of the barrel 100, a guide groove 120 is formed to be connected to one ends of the inlets 110 (see FIGS. 10A and 10B). The guide groove 120 may extend in the circumferential or height direction of the barrel 100. For example, the guide groove 120 may be formed to have a spiral form as illustrated in FIG. 10A. If necessary, the guide groove 120 may be formed to have a circular or linear form, not a spiral, as illustrated in FIG. 10B.

The lenses 210, 220, 230, 240, 250 and 260 are accommodated inside the barrel 100. For example, the first lens 210, the second lens 220, the third lens 230, the fourth lens 240, the fifth lens 250, and the sixth lens 260 are sequentially disposed in the height direction of the barrel 100. The first lens 210 to the sixth lens 260 may be classified as a front lens, an intermediate lens, and a rear lens depending on the positions in which the lenses are disposed. The first lens 210 is a front lens disposed closest to the object side in the interior of the barrel 100, the second lens 220 to the fifth lens 250 are intermediate lenses, and the sixth lens 260 is a rear lens disposed closest to the imaging plane in the interior of the barrel 100.

The positions of the first lens 210 and the sixth lens 260 may be aligned while being in contact with the barrel 100. For example, the upper portion and side surface of the flange portion of the first lens 210 may be in contact with the inner circumferential surface of the barrel 100 so that the positions thereof relative to the barrel 100 may be aligned. Similarly, the side surface of the flange portion of the sixth lens 260 may contact the inner circumferential surface of the barrel 100 so that the position thereof relative to the barrel 100 may be aligned.

The second lens 220 to the fifth lens 250, the intermediate lenses, may be disposed at a distance from the inner circumferential surface of the barrel 100. For example, a separation space G may be formed between the outer circumferential surfaces of the intermediate lenses and the inner circumferential surface of the barrel 100.

The second lens 220 to the fifth lens 250, the intermediate lenses, may be combined with a front or rear lens to be aligned with respect to the positions. For example, the second lens 220 to the fifth lens 250 may be provided with irregularities 222 and 232 formed on upper and lower portions of the second lens 220 to the fifth lens 250, to be engaged with adjacent lenses. Accordingly, the second lens 220 to the fifth lens 250 may be combined with a front or rear lens without contacting the barrel 100, such that relative positions thereof with respect to the barrel 100 and the optical axis may be aligned.

The adhesive 400 may be injected into the barrel 100 to fix the positions of the intermediate lenses. For example, the adhesive 400 may fill the separation space G through the inlets 110 to firmly bond the intermediate lenses and the barrel 100.

Accordingly, according to this example, even when the separation space G is formed between the inner circumferential surface of the barrel 100 and the lens, the lenses 220, 230, 240 and 250 may be firmly fixed to the inside of the barrel 100.

As set forth above, according to the various examples, the bonding force between a lens barrel and a lens may be improved.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a barrel defining a hole configured to receive light reflected from a subject, and defining a lens accommodation space configured to accommodate a plurality of lenses;
a front lens accommodated in the lens accommodation space and disposed closest to the subject;
a rear lens accommodated in the lens accommodation space and disposed closest to an imaging plane; and
an intermediate lens disposed between the front lens and the rear lens,
wherein an inlet is defined in a side surface of the barrel, the inlet is connected to the lens accommodation space, and an adhesive bonding the intermediate lens to the barrel is disposed in the inlet, and
wherein the barrel comprises a guide groove extended along an inner circumferential surface thereof and the guide groove is connected to an end of the inlet.

2. The camera module of claim 1, wherein the inlet extends in a direction intersecting an optical axis of the barrel.

3. The camera module of claim 1, wherein the guide groove has a circular or spiral shape along an inner circumferential surface of the barrel.

4. The camera module of claim 1, wherein the intermediate lens defines a groove disposed in an outer circumferential surface thereof, the groove being configured to accommodate the adhesive.

5. The camera module of claim 1, wherein the intermediate lens has a first length in a first direction intersecting an optical axis and a second length, different from the first length, in a second direction intersecting the optical axis and the first direction.

6. The camera module of claim 1, wherein one side of the intermediate lens intersecting the optical axis is linear.

7. A camera module comprising:
a barrel defining a lens accommodation space configured to accommodate a plurality of lenses;
a first lens disposed in the lens accommodation space and in contact with an inner circumferential surface of the barrel; and
a second lens disposed in the lens accommodation space and spaced apart from the inner circumferential surface of the barrel by a separation space,
wherein an inlet is defined in a side surface of the barrel and an adhesive is injected into the separation space through the inlet, and
wherein the barrel comprises a guide groove extended along an inner circumferential surface thereof and the guide groove is connected to an end of the inlet.

8. The camera module of claim 7, wherein the first lens and the second lens each comprise irregularities such that an optical axis is aligned by mutual coupling of the first and second lenses.

9. The camera module of claim 7, wherein the guide groove has a circular or spiral shape along the inner circumferential surface of the barrel.

10. The camera module of claim 7, wherein the inlet comprises a plurality of inlets disposed at intervals in a circumferential direction of the barrel.

11. The camera module of claim 7, wherein the first lens is disposed on an object side of the second lens with respect to an optical axis of the barrel.

12. The camera module of claim 7, wherein the first lens is disposed on an image side of the second lens with respect to an optical axis of the barrel.

* * * * *